United States Patent [19]
Tomono et al.

[11] Patent Number: 5,390,201
[45] Date of Patent: Feb. 14, 1995

[54] SELF-FREQUENCY-DOUBLER LASER ELEMENT

[75] Inventors: Takao Tomono; Tasunari Nishikata; Lyong S. Pu, all of Kanagawa; Keisuke Sasaki, 5-4-9, Minami, Shinozaki-cho, Edogawa-ku, Tokyo, all of Japan

[73] Assignees: Fuji Xerox Co., Ltd.; Keisuke Sasaki, both of Tokyo, Japan

[21] Appl. No.: 160,868

[22] Filed: Dec. 3, 1993

[30] Foreign Application Priority Data

Dec. 4, 1992 [JP] Japan .................. 4-350214

[51] Int. Cl.$^6$ ................................. H01S 3/10
[52] U.S. Cl. ..................... 372/22; 372/96; 372/41; 372/21; 372/64; 372/92; 372/7
[58] Field of Search .......... 372/96, 98, 41, 21, 372/64, 92, 7

[56] References Cited

FOREIGN PATENT DOCUMENTS 59-47288  11/1984  Japan .

OTHER PUBLICATIONS

"The Fundamentals of Optoelectronics", Yarlv, A., translated by Kunio Tada and Takeshi Kamiya, pp. 200–205.

"Phase Matched Second Harmonic Generations in Poled Dye–Polymer Waveguides", Sugihara et al., Physical Concepts of Materials for Novel Optoelectronic Device Applications I, SPIE, vol. 1361, pp. 599–605, 1990.

"Optical Electronics", Yariv, A., pp. 6–7, 226–253 and 402–429.

"Organic Nonlinear Materials", Umegaki, M., pp. 50–60.

"A Series of New Materials, New Organic Nonlinear Optical Materials I, Most Advanced Material Development", Nakanishi et al., pp. 6–15.

*Primary Examiner*—Leon Scott, Jr.
*Attorney, Agent, or Firm*—Finnegan, Henderson, Farabow, Garrett & Dunner

[57] ABSTRACT

A self-frequency-doubler laser element having a three-dimensional optical waveguide includes a first transparent insulating substrate having both a DFB grating and a grating reflector formed on one side of the DFB grating, a $Nd^{3+}$-ion-doped thin glass film laid over the first transparent insulating substrate, a thin nonlinear optical film laid over the thin glass film, a second transparent insulating substrate laid over the thin nonlinear optical film, and a thin reflecting film laid over the second transparent insulating substrate, wherein the following conditions are satisfied: $nf - ng = 0.01$ to $0.05$, and $nf$ and $ng$ are greater than $ns$ and $nc$, where $ns$, $ng$, $nf$, and $nc$ are the refractive indices of the first transparent insulating substrate, the thin glass film, the thin nonlinear optical film, and the second transparent insulating substrate, respectively. The optical waveguide generates a laser fundamental harmonic, converts it to a second higher harmonic having a wavelength one-half of the laser fundamental harmonic, and emits the second higher harmonic.

5 Claims, 3 Drawing Sheets

SELF-FREQUENCY-DOUBLER LASER ELEMENT

BACKGROUND OF THE INVENTION

The present invention relates to a self-frequency-doubler laser element having a laser oscillation function in emitting a laser excitation beam and a wavelength conversion function in converting the fundamental harmonic that has been generated by the laser excitation beam to a second higher harmonic having half the wavelength of that of the fundamental harmonic.

Heretofore, attempts have been made to reduce a laser beam to having a short wavelength and there have been proposed some optical wavelength conversion elements for converting the wavelength of a laser beam for the purpose.

For example, an optical wavelength conversion element of a bulk crystal type has been introduced in "The Fundamentals of Optoelectronics" by A. Yarlv, translated by Kunio Tada and Takeshi Kamiya, pp 200 to 204, Published by Maruzen Co., Ltd. However, it is essential for second higher harmonics produced in a nonlinear optical material to match and strengthen each other, that is, the phase matching condition needs establishing in the optical wavelength conversion element of the bulk crystal type. Therefore, the birefringence of the crystal has to be utilized and there still arises a problem in that materials having no birefringence properties or few of them are not directly utilizable even though they are nonlinear at a molecular level.

As an optical wavelength conversion element capable of solving the above problem, an optical wavelength conversion element of a three-dimensional optical waveguide type has been introduced in, for example, "Extended Abstracts, Physical Concepts of Materials for Novel Optoelectronic Device Applications," by O. Sugiura et al., SPIE, Vol. 1361, p 599 (1990). Typical second higher harmonic phase matching methods making use of The three-dimensional optical waveguide are known to include (1) a method of matching mode-to-mode phases of a fundamental harmonic and a second higher harmonic under control over film thickness, and (2) a method of matching phases in between the waveguide mode of a fundamental harmonic and a radiation mode toward the ground of a second higher harmonic. The method (1) is said to be particularly promising because an output proportional to the square of the propagation length is obtainable.

Studies are enthusiastically being made of optical wavelength conversion elements which employ organic nonlinear optical materials whose nonlinearity and response speed are greater than those of inorganic nonlinear optical materials. Moreover, attempts have also been made to combine such an optical wavelength conversion element with a laser so as to develop a laser in a visible range.

If, however, an optical system is fabricated with an $Nd^{3+}$YAG laser intended for a fundamental harmonic, the laser tends to become large in shape and consequently the system may not be made compact since a light source such as a xenon lamp is used for excitation light. As a result, it is attempted to make a system compact by employing a semiconductor laser for a fundamental harmonic. When the semiconductor laser is used for an optical system, an internal resonance laser will fall under the category of use. However, organic crystals lack transparency as their processability is bad at the present technological level and this poses a problem of failure in sufficient power.

SUMMARY OF THE INVENTION

The present inventors have directed their persistent research toward developing a compact laser in a visible range which can be integrated into an optical system by increasing the conversion efficiency of an optical wavelength conversion element. As a result of such research, the present inventors have completed the present invention by finding it possible not only to output sufficient power but also to attain a compact device using a three-dimensional optical waveguide by effectively utilizing the laser beam introduced from a semiconductor laser into a thin glass film and increasing the conversion efficiency of the wavelength in the three-dimensional optical waveguide. The three-dimensional optical waveguide comprises a first transparent insulating substrate having a DFB grating and a grating reflector, an $Nd^{3+}$-ion-doped thin glass film laid thereon, a polymeric or crystalline thin nonlinear optical film doped with a nonlinear optical material or having the nonlinear optical material introduced into its side chain, the thin nonlinear optical film being laid on the thin glass film, a second transparent insulating substrate laid on the thin nonlinear optical film, and a thin film for reflecting light in a specific wavelength range, the thin film being laid on the second transparent insulating substrate. Respective refractive indexes in the first transparent insulating substrate, the thin glass film, the thin nonlinear optical film and the second transparent insulating substrate are set under predetermined conditions.

An object of the present invention is therefore to provide a self-frequency-doubler laser element capable of making a system compact by incorporating a semiconductor laser therein and of emitting a laser beam in a visible range with high output power.

DETAILED DESCRIPTION OF THE PREFERRED EMBODIMENTS

Figure 1:
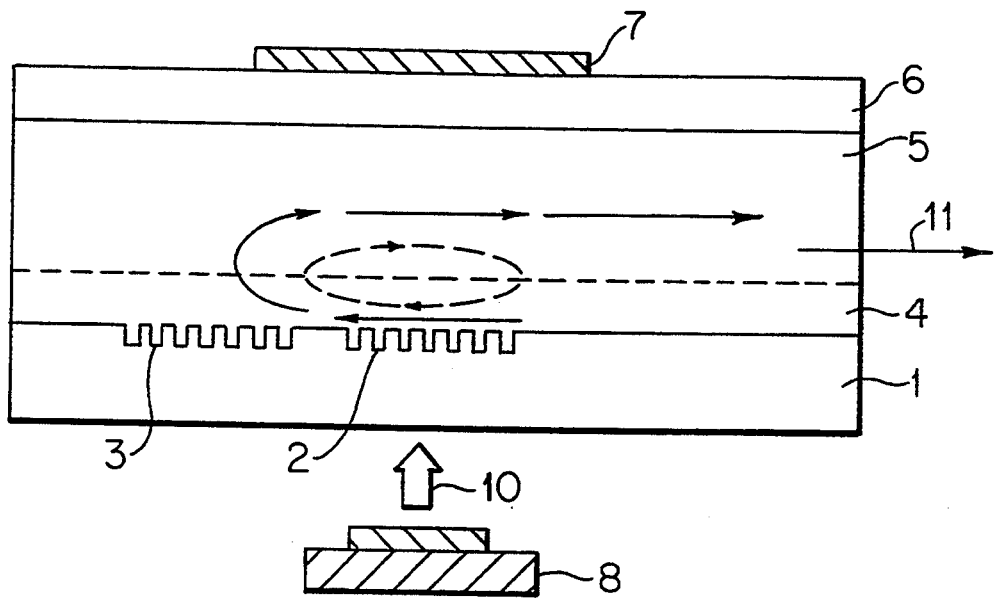
FIG. 1 is a sectional view of a self-frequency-doubler laser element embodying the present invention.

The present invention is implemented by providing a self-frequency-doubler laser element equipped with a three-dimensional optical waveguide comprising a first transparent insulating substrate having a DFB grating and a grating reflector formed on one side of the DFB grating, an $Nd^{3+}$-ion-doped thin glass film laid thereon, a polymeric or crystalline thin nonlinear optical film doped with a nonlinear optical material or having the nonlinear optical material introduced into its side chain, the thin nonlinear optical film being laid on the thin glass film, a second transparent insulating substrate laid on the thin nonlinear optical film, and a thin film for reflecting light in a specific wavelength range, the thin film being laid on the second transparent insulating substrate, the three-dimensional optical waveguide satisfying the following conditions of the refractive index:

nf−ng=0.01 to 0.05, and nf, ng>ns, nc (where ns=refractive index of the first transparent insulating substrate, ng=refractive index of the thin glass film, nf=refractive index of the thin nonlinear optical film and nc=refractive index of the second transparent insulating substrate). When a laser excitation beam is irradiated from the semiconductor laser, the $Nd^{3+}$ions in the thin glass film are excited by the laser excitation beam and a laser fundamental harmonic having a predetermined wavelength is generated within the DFB grating of the first transparent insulating substrate. Then the laser fundamental harmonic is converted to a second higher harmonic having a ½ short wavelength in the thin nonlinear optical film located above and between the DFB grating and the grating reflector. The second higher harmonic thus generated is propagated in the three-dimensional optical waveguide and reflected by the grating reflector on one side of the DFB grating before being emitted from the other side of the DFB grating.

With respect to the first transparent insulating substrate of the three-dimensional optical waveguide as the optical wavelength conversion element, it is basically in the form of a flat plate and free from absorption in the region of the second higher harmonic. The first transparent insulating substrate is also formed of quartz glass, pyrex glass or the like as its refractive index ns is needed to be smaller than the refractive index ng of the thin glass film and the refractive index nf of the thin nonlinear optical film. Further, the first transparent insulating substrate is normally about 0.05 to 10 mm thick and preferably about 0.1 to 2 mm thick; if it is too thin, there arises a problem of causing an electric field on the substrate side to be formed outside the substrate, whereas if it is too thick, the problem is that the device tends to become large in size.

The DFB grating to be formed on the first transparent insulating substrate may be designed according to the method described in "Optical Integrated Circuits" by Hiroshi Nishihara, Masamitsu Haruna and Toshiaki Narahara, published by Ohm Co. as long as its length is concerned, and according to the method described in "Optical Electronics" by Amnon Yariv, published by Holt-Saunders International Editions with respect to its frequency and spacing.

Figure 5:
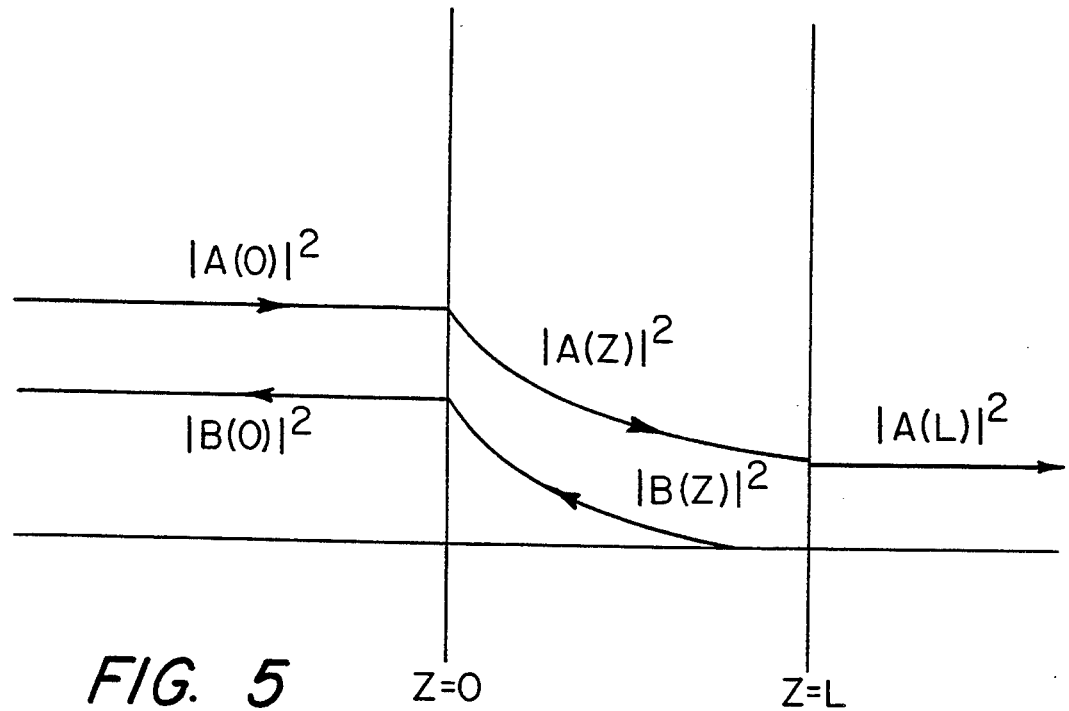
FIG. 5 is a diagram illustrating a method of designing the length of the grating.

The length of the DFB grating is designed as shown in FIG. 5. More specifically, a forward wave A(0) of a propagation vector $\beta a$ which advances in the waveguide enters a grating region (Z=0 to L) and splits into two: a forward wave A(Z) advancing while being slowly reflected thereat and a backward wave B(Z) which is reflected thereat before being moved back and whose energy level has dropped down. The backward wave B(Z) moves out of the grating region (Z=0 to L) and becomes a forward wave B(0) of a propagation vector $\beta b$ which retreats again in the waveguide. Moreover, a forward wave A(L) as a loss equivalent to the drop in energy passes through the grating region (Z=0 to L). A mode coupling equation at this time is given by $$+dA(Z)/dz = -jx^*B(Z)exp(-2j^\Delta Z)(\beta a>0) \quad (1)$$

$$-dB(Z)/dz = -jx^*A(Z)exp(+2j^\Delta Z)(\beta a<0) \quad (2)$$

[where, x=xba(q) represents a coupling coefficient, $\Delta=\beta b-(\beta a+qK)$ a degree of deviation from the phase matching condition and q a coupling degree].

Given the length L of the grating when the forward wave A(0) is incident, a power shift ratio ($\eta$) is obtained from the following equation by solving it under the boundary conditions of A(0)=1, B(L)=0, $$\eta = |B(0)|^2/|A(0)|^2 = |(1+(1-\Delta^2/|x|^2)/[\sin h^2((|x|-\Delta^2)^{\frac{1}{2}}L)]^{-1}$$

As long as $|\Delta|<|x|$, $|B(0)|^2 \to 1$ if $L \to \infty$, that is, power completely shifts. Particularly when $\Delta=0$, $\eta=\eta o=\tan h^2(|x|L)$.

Therefore, $\eta o \geq 0.84$ when $L \geq Lc$ and the greater part of power shifts; in other words, the power shift ratio ($\eta$) improves as L becomes greater. When a reduction in power due to the propagation loss is taken into consideration, L=4 to 6 mm is preferred and L=about 5 mm is most preferred, though L=2 to 10 mm is also possible according the results of experiments made by the present inventors.

Moreover, the frequency and spacing of the DFB may be designed as follows. A propagation constant within the grating region (Z=0 to L) is expressed by $$\beta' = \beta o \pm jS = \beta o \pm j\{x^2-(\Delta\beta(\omega))^2\}^{\frac{1}{2}}$$

(where $\beta o=1\pi/\Lambda$, $\Delta\beta=\beta(\omega)-\beta o$).

In this case, $\beta(\omega)$ near the Bragg's condition ($1\pi/\Lambda$) is made $\beta(\omega) \approx koNeff$ (ko=$2\pi/\lambda$). Incidentally, $\Lambda$ represents the grating frequency. A greater reflection factor is shown with respect to a light wave having an angular frequency near the Bragg's condition in the waveguide having such a grating.

Figure 6:
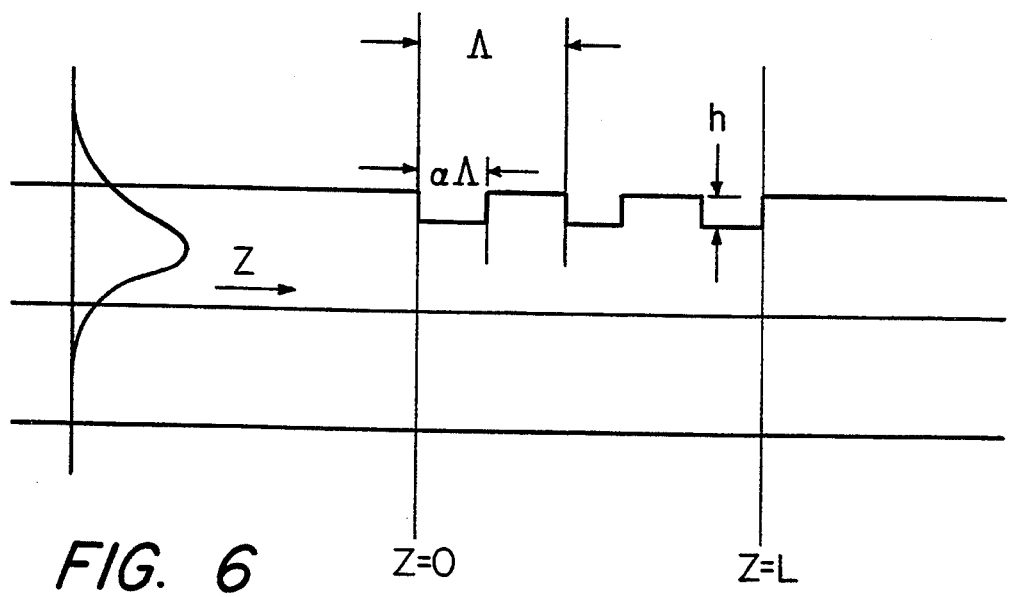
FIG. 6 is a diagram illustrating a method of designing the frequency and spacing of the grating.

Consequently, the frequency of the grating under the phase matching condition becomes 358 nm at 1.64 nm in terms of theoretic calculation. In FIG. 6, a coefficient $\alpha$ for determining the spacing is set at ½ and the height h is set at 300 nm.

According to the results of experiments made by the present inventors, the frequency ($\Lambda$) of the DFB grating should be set at 353 to 363 nm and preferably 355 to 361 nm, whereas the spacing ($\alpha\Lambda$) should be set at 101.4 to 250.6 nm and preferably 143.2 to 214.8 nm. Regarding the height h, it should normally be set at 20 to 700 nm and preferably 300 to 500 nm.

The grating reflector formed in the first transparent insulating substrate is similarly designed so that, in accordance with the above references, the grating frequency ($\Lambda$) should be set at 175 to 183 nm and preferably 177 to 181 nm at 532 nm in terms of theoretic calculation and that the spacing ($\alpha\Lambda$) should be set at 54 to 125 nm and preferably 71.6 to 107.4 nm and that the height h should be set at normally 20 to 700 nm and preferably 300 to 500 nm.

According to the present invention, the $Nd^{3+}$-ion-doped thin glass film and the polymeric or crystalline thin nonlinear optical film doped with a nonlinear optical material or having the nonlinear optical material introduced into its side chain are successively stacked on the first transparent insulating substrate in the order in which the former or the latter is laid thereon first.

In this case, it is essential that the thin glass film is doped with $Nd^{3+}$ ions. With respect to the material used for the thin glass film, use can be made of, for example, silicate glass and Corning 7059 which have substantially the same refractive index as that of thin nonlinear optical film and what is greater than that of the first transparent insulating substrate.

The thin glass film is normally laid by the sputtering or sol-gel method on the first transparent insulating substrate on which the DFB grating and the grating reflector have been formed. The thin glass film prepared by adding $Nd^{3+}$ ions thereto is then doped with the $Nd^{3+}$ ions.

The thickness of the thin glass film thus prepared is normally in the range of 0.05 to 0.3 μm and preferably 0.1 to 0.2 μm, whereas the quantity of $Nd^{3+}$ ions to be added to the thin glass film is normally in the range of 0.1 to 5% and preferably 0.5 to 0.9%. If the thickness of the thin glass film is less than 0.05 μm, it will pose a problem of making oscillation unavailable as the quantity of doped $Nd^{3+}$ ions is too small, whereas if the thickness thereof is greater than 0.3 μm, it will also pose a problem of making it necessary to control the refractive index of the thin glass film precisely. If, moreover, the quantity of $Nd^{3+}$ ions to be added to the thin glass film is smaller than 0.1% or greater than 5%, it will further pose a problem of making oscillation unavailable as the quantity of doping is small or causing crystallization within the thin amorphous film.

The thin nonlinear optical film to be formed on the thin glass film or the first transparent insulating substrate before the formation of the thin glass film is the aforesaid polymeric or crystalline thin nonlinear optical film doped with a nonlinear optical material or having the nonlinear optical material introduced into its side chain. With respect to the thin nonlinear optical film, use can be made of an inorganic thin nonlinear optical film dispersed in a transparent crystalline inorganic material or an organic thin nonlinear optical film obtained by doping an organic nonlinear optical material such as pigment with polymeric material or introducing the organic nonlinear optical material into its side chain. In view of optical wavelength conversion efficiency, the organic thin nonlinear optical film is preferably employed.

The specific organic nonlinear optical material for use in forming such an organic thin nonlinear optical film includes, as introduced in "Organic Nonlinear Materials" by M. Umegaki pp 25 to 54, various mononuclear aromatic derivatives, ortho position bisubstitution benzene, meta position bisubstitution benzene, para position bisubstitution benzene, trisubstitution benzene, R, R' substitution polynuclear aromatics, cyanine and melocyanine pigments, pyridine derivatives, urea derivatives and the like. In addition, there are such cyclobutenedion derivatives for use as those enumerated in "A Series of New Materials, New Organic Nonlinear Optical Materials I, Most Advanced Material Development" by Nakanishi, Kobayashi, Nakamura, Umegaki, pp 50 to 60 and "Cyclobutenedion Derivatives Containing Methacroyl Groups, Single Substances and Copolymers, and Process of Producing Them," Japanese Patent Application No. 86551/1992 by the present applicants. Regarding polymeric materials as carriers of those organic nonlinear optical materials, it is only necessary for them to satisfy the following conditions: they are basically noncrystalline and optically transparent, dissolve in a solvent whose boiling point is in the range of 30° to 250° C. and preferably 60° to 150° C. with a concentration of 1 wt % or greater and with the thermal decomposition commencement temperature being higher by 5° C. or greater than the glass transformation temperature. There are additional polymeric materials such as polymethacrylic acid methyl and polystyrene, additional copolymers such as styrene acrylonitrile copolymers, and condensation polymeric materials such as polycarbonate, aromatic polyester and aromatic polyester sulfone.

The thin nonlinear optical film formed in this case needs forming to satisfy the phase matching condition so as to make the optical wavelength conversion function efficiently performed, depending on the kind of the nonlinear optical material for use and the inorganic or organic material as a carrier. With respect to the method of preparing the thin nonlinear optical film, what is specifically considered includes a spin-coating and a dip-coating method for poled polymers and the Bridgeman method as to crystallization.

Further, the second transparent insulating substrate is laid on the thin nonlinear optical film. The second transparent insulating substrate is laid thereon to confine light in a waveguide layer (the thin glass layer or the thin nonlinear optical film) and, like the first transparent insulating substrate, it is arranged so that no absorption occurs in the region of the second higher harmonic and that its refractive index ns is smaller than ng of the thin glass film and nf of the thin nonlinear optical film laid thereon; namely, quartz or pyrex glass or the like is used therefor. The thickness of the second transparent insulating substrate is normally in the range of 0.05 to 10 mm and preferably about 0.1 to 2 mm. If the second transparent insulating substrate is too thin, the problem is that it will cause the thin nonlinear optical film to be formed outside the substrate or otherwise will cause the device to become large in size if it is too thick.

A thin film for reflecting a beam in a specific wavelength range is provided on the second transparent insulating substrate according to the present invention. By reflecting the laser excitation beam emitted from the semiconductor laser and subsequently passed through the first transparent insulating substrate, the thin glass film, the thin nonlinear optical film and the second transparent insulating substrate, the thin beam reflector film is designed to effectively utilize the laser excitation beam in a manner that allows the film to increase the quantity of laser fundamental harmonic generated in the DFB grating and ultimately the quantity of second higher harmonic having a ½ short wavelength resulting from conversion in the thin nonlinear optical film. Consequently, the thin beam reflector film is normally provided above and in a region where the DFB grating for shortening the wavelength exists and formed of a material capable of reflecting the laser excitation beam as a dielectric multilayer film.

It is essential according to the present invention that the following refractive index condition exists among the first transparent insulating substrate, the thin glass film, the thin nonlinear optical film and the second transparent insulating substrate, ng−ng=0.01 to 0.05, and nf, ng<ns, nc (where ns=refractive index of the first transparent insulating substrate, ng=refractive index of the thin glass film, nf=refractive index of the thin nonlinear optical film and nc=refractive index of the second transparent insulating substrate). If the above refractive index condition is not met, there will arise a problem of failure in confining the laser fundamental harmonic and the second higher harmonic in the waveguide.

Since the thin glass film is doped with $Nd^{3+}$ ions according to the present invention, the $Nd^{3+}$ ions are excited by the laser excitation beam (wavelength 0.81

μm) and the beam generated thereby has a wavelength of 1.064 μm, 0.9 μm or 1.3 μm. By resonating the beam having one of the wavelengths as the laser fundamental harmonic within the DFB grating, the fundamental harmonic is reduced to having a ½ short wavelength by means of the nonlinear optical material in the thin nonlinear optical film while it is being resonated within the DFB grating. The second higher harmonic having a wavelength of 0.532 μm, 0.45 μm or 0.65 μm thus generated is emitted from the three-dimensional optical waveguide. The conversion efficiency is increased since the fundamental harmonic is reduced to having a ½ short wavelength by means of the nonlinear optical material while it is being resonated within the DFB grating. Moreover, the thin beam reflector film is usable for efficiently utilizing the laser excitation beam and three primary colors can also be formed. As a result, the system can readily be made compact as such a semiconductor laser is utilized.

Referring to examples, the present invention will be described in detail.

EXAMPLE 1

Figure 2:
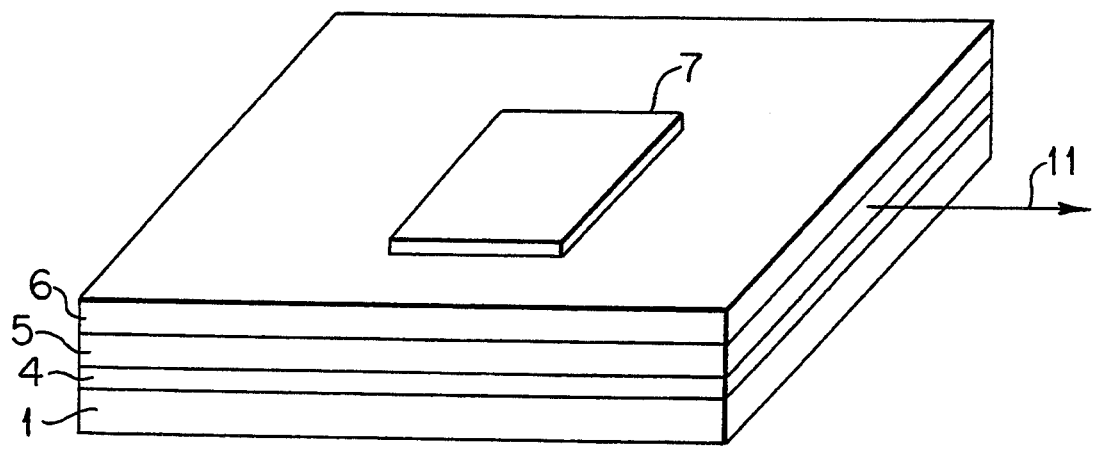
FIG. 2 is a perspective view of FIG. 1.
Figure 3:
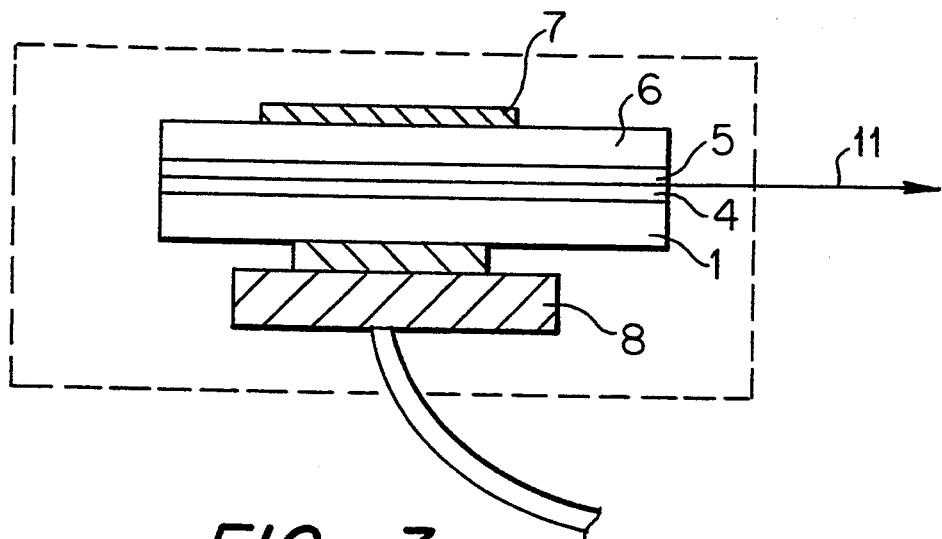
FIG. 3 is a diagram illustrating the emission of a second higher harmonic to be emitted by the self-frequency-doubler laser element and the semiconductor laser of FIG. 1.

Self-frequency-doubler laser elements so structured as shown in FIGS. 1–3 and designed to emit a green beam having a wavelength of 0.532 μm were manufactured in Example 1.

More specifically, a pyrex glass substrate 1 having a thickness of 1 mm was used as a first transparent insulating substrate and a DFB grating 2 of 1064 nm as well as a grating reflector 3 of 532 nm was formed thereon. The DFB grating 2 was designed to have a frequency of 358 nm with a value of $\alpha$ set at 0.5, the brazing height h at 300 nm and the grating area L at 5 mm. The grating reflector 3 was designed to have a frequency of 179 nm with a value of $\alpha$ set at 0.5, the brazing height h at 300 nm and the grating area L at 5 mm.

The formation of the grating comprises the steps of spin-coating the glass substrate 1 with positive photoresist, exposing it to light by a two luminous flux interference method with an Ar ion laser beam (wavelength 488 nm) as a beam source, and developing it by dry etching. It was confirmed that the frequency of the grating thus formed had conformed substantially to the specification designed as a result of measuring the diffracted angle.

After the grating was thus formed on the glass substrate 1, a thin glass film 4 having a thickness of 0.1 μm was laid thereon by sol-gel spin-coating the glass substrate 1 with silicic acid glass containing 3.5 wt % $Nd^{3+}$ ions. Further, a thin nonlinear optical film 5 containing 10 wt % cyclobutenedion derivatives in PMMA resin as an organic nonlinear optical material was laid on the thin glass film 4 by the spin-coating method according to Japanese Patent Application No. 86551/1992, the thin nonlinear optical film 5 being 2.42 μm thick.

In addition, a pyrex glass substrate 6 with a derivative multilayer film 7 provided thereon beforehand is laid on the thin nonlinear optical film 5 so as to locate the derivative multilayer film above the DFB grating 2, the pyrex glass substrate 6 and the derivative multilayer film 7 being 0.1 mm and 0.5 μm thick, respectively. In this case, the pyrex glass substrate 6 was made a second transparent insulating substrate and the derivative multilayer film 7 a thin beam reflector film.

The device thus prepared was placed in an oven to manufacture the self-frequency-doubler laser element in Example 1 by heating the PMMA resin forming the thin nonlinear optical film 5 at the glass transformation temperature (130° C.) and subjecting it to the corona poring process in an electromagnetic field of 5 kV/cm.

One hundred pieces of self-frequency-doubler laser elements were manufactured in the first-case and three of them conformed substantially to the specification designed.

Those three self-frequency-doubler laser elements were tested by tightly sticking the emission side of a 760 mW semiconductor laser 8 to the rear side of the first transparent insulating substrate of the self-frequency-doubler laser element and emitting a laser excitation beam 10 having a wavelength of 0.81 μm from the semiconductor laser 8. Then a green beam 11 having a wavelength of 0.532 μm was emitted from the emission side of the self-frequency-doubler laser element.

EXAMPLE 2

Self-frequency-doubler laser elements were manufactured as in the case of Example 1 except that the designed frequencies of the DFB grating 2 and the grating reflector 3 were respectively set at 3.02.8 nm and 151.4 nm, and the thickness of the thin nonlinear optical film 5 at 2.38 μm.

Those self-frequency-doubler laser elements were tested as in Example 1 by emitting the laser excitation beam 10 having a wavelength of 0.81 μm from the semiconductor laser 8. Then a blue beam 11 having a wavelength of 0.45 μm was emitted from the emission side of the self-frequency-doubler laser element.

EXAMPLE 3

Self-frequency-doubler laser elements were manufactured as in the case of Example 1 except that the designed frequencies of the DFB grating 2 and the grating reflector 3 were respectively set at 437 nm and 219 nm, and the thickness of the thin nonlinear optical film 5 at 2.48 μm.

Those self-frequency-doubler laser elements were tested as in Example 1 by emitting the laser excitation beam 10 having a wavelength of 0.81 μm from the semiconductor laser 8. Then a red beam 11 having a wavelength of 0.65 μm was emitted from the emission side of the self-frequency-doubler laser element.

EXAMPLE 4

Figure 4:
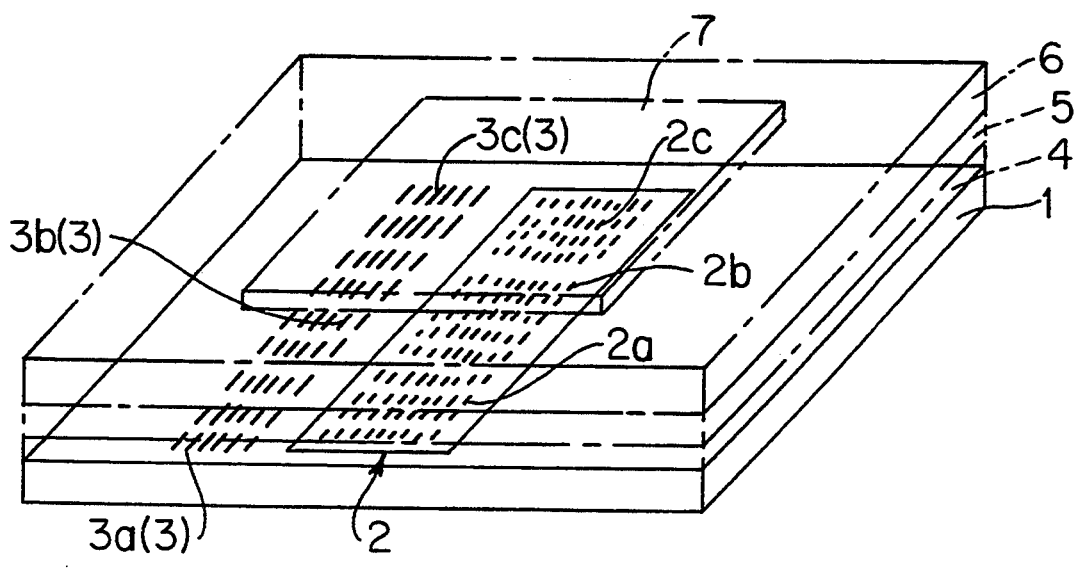
FIG. 4 is a partial perspective view of a combination of DFB gratings and grating reflectors in a self-frequency-doubler laser element in Example 4.

As shown in FIG. 4, self-frequency-doubler laser elements were manufactured as in the case of Example 1 except that there were formed gratings 2a, 2b, 2c as the DFB gratings 2 with respective frequencies of 437 nm, 385 nm, 302 nm and grating reflectors 3a, 3b, 3c as the grating reflectors 3 with respective frequencies of 219 nm, 179 nm, 151.4 nm; further, the thin nonlinear optical film 5 whose thickness varies from 2.2 μm to 2.6 μm was arranged so that its thickness corresponds to respective pairs of gratings 2a, 3a, 2b, 3b and 2c, 3c at respective values 2.48 μm, 2.42 μm and 2.38 μm.

Those self-frequency-doubler laser elements were tested as in Example 1 by emitting a laser excitation beam 10 having a wavelength of 0.81 μm from the semiconductor laser 8. Then a red beam having a wavelength of 0.65 μm, a green beam having a wavelength of 0.532 μm and a blue beam having a wavelength of 0.45 μm were emitted from the emission side of the self-frequency-doubler laser element.

The self-frequency-doubler laser element according to the present embodiment is suitably applicable to, for example, optical scanning recorders and readers for carrying out precision scanning, and optical communications light sources.

What is claimed is:

1. A self-frequency-doubler laser element having a three-dimensional optical waveguide, comprising:
 a first transparent insulating substrate having both a DFB grating and a grating reflector formed on one side of said DFB grating;
 a $Nd^{3+}$-ion-doped thin glass film laid over the first transparent insulating substrate;
 a thin nonlinear optical film laid over said thin glass film;
 a second transparent insulating substrate laid over said thin nonlinear optical film; and
 a thin reflecting film laid over said second transparent insulating substrate,
 wherein said three-dimensional optical waveguide satisfies the following conditions:
  nf−ng=0.01 to 0.05, and nf and ng are greater than ns and nc
 where
  ns=refractive index of the first transparent insulating substrate,
  ng=refractive index of the thin glass film,
  nf=refractive index of the thin nonlinear optical film, and
  nc=refractive index of the second transparent insulating substrate;
 when the $Nd^{3+}$ thin glass film is excited, the optical waveguide generates a laser fundamental harmonic having a predetermined wavelength which is generated within said DFB grating of said first transparent insulating substrate;
 said thin nonlinear optical film laid over said first insulating substrate converts the laser fundamental harmonic to a second higher harmonic having a wavelength one-half of the laser fundamental harmonic, such that said second higher harmonic is propagated in said three-dimensional optical waveguide and reflected by said grating reflector on one side of said DFB grating before being emitted from the other side of said DFB grating.

2. A self-frequency-doubler laser element of claim 1, wherein said laser fundamental harmonic excited in said DFB grating of said first transparent insulating substrate has a wavelength of 1.064 μm, 0.9 μm or 1.3 μm and, wherein said second higher harmonic emitted from said three-dimensional optical waveguide has a wavelength of 0.532 μm, 0.45 μm or 0.65 μm.

3. A self-frequency-doubler laser element of claim 1, wherein said first transparent insulating substrate is composed of pyrex glass having a 1 mm thickness, wherein
 said DFB grating has a frequency, Λ, of 358 nm, a spacing equal to αΛ with a value of α set at 0.5, a brazing height of 300 nm, and a grating area of 5 mm, and
 said grating reflector has a frequency, Λ, of 179 nm, a spacing equal to αΛ with a value of α set at 0.5, a brazing height of 300 nm, and a grating area of 5 mm, and
 said thin nonlinear optical film has a 2.42 μm thickness.

4. A self-frequency-doubler laser element of claim 1, wherein said first transparent insulating substrate is composed of pyrex glass having a 1 mm thickness, wherein
 said DFB grating has a frequency, Λ, of 302.8 nm, a spacing equal αΛ with a value of α set at 0.5, a brazing height of 300 nm, and a grating area of 5 mm, and
 said grating reflector has a frequency, Λ, of 1.51.4 nm, a spacing equal to αΛ with a value of α set at 0.5, a brazing height of 300 nm, and a grating area of 5 mm, and
 said thin nonlinear optical film has a 2.38 μm thickness.

5. A self-frequency-doubler laser element of claim 1, wherein said DFB grating comprises
 a grating having frequencies of 437 nm, 358 nm, and 302 nm, and said grating reflector comprises
 a grating having frequencies of 219 nm, 437 nm, 151.4 nm, respectively.

* * * * *